United States Patent [19]
Devillers et al.

[11] 3,785,863
[45] Jan. 15, 1974

[54] PROCESS AND PLANT FOR THE PURIFICATION OF RAW SUGAR JUICE

[75] Inventors: Pierre Louis Henri Devillers, La Celle Saint Cloud; Michel Loilier, La Garenne Colombes, both of France

[73] Assignee: Syndicat National des Fabricants de Sucre de France, Paris, France

[22] Filed: Aug. 23, 1971

[21] Appl. No.: 173,999

[30] Foreign Application Priority Data
Aug. 25, 1970 France .............................. 70.31004

[52] U.S. Cl. ..................... 127/9, 127/46 A, 210/30
[51] Int. Cl. .............................................. C13d 3/14
[58] Field of Search ..................... 127/46 A, 50, 9

[56] References Cited
UNITED STATES PATENTS

| | | | |
|---|---|---|---|
| 3,097,114 | 7/1963 | Assalini | 127/46 A |
| 2,477,206 | 7/1949 | Rinehart | 127/50 |
| 2,678,288 | 5/1954 | Cotton | 127/46 A |
| 2,496,244 | 1/1950 | Gayle | 127/46 A |
| 2,551,519 | 5/1951 | Winters | 127/46 A |
| 2,964,428 | 12/1960 | Delfos | 127/50 |

*Primary Examiner*—Morris O. Wolk
*Assistant Examiner*—Sidney Marantz
*Attorney*—Irvin S. Thompson and Robert J. Patch

[57] ABSTRACT

A process and plant for purifying raw sugar juice such as diffusion or expressed juice comprising passing the juice through a first strong H+ cation exchanger; neutralizing the resultant liquid with lime and filtering the neutralized liquid, passing it successively through a second strong cation exchanger and a weak anion exchanger, purifying the liquid coming from the weak anion exchanger with phosphoric acid after a second filtration, passing the filtrate from the second filtration through a weak cation exchanger and a strong cation exchanger. The neutralized liquid is preferably cooled before going into said first and second cation exchangers at a temperature such that the sugar contained therein is not practically subject to inversion.

11 Claims, 2 Drawing Figures

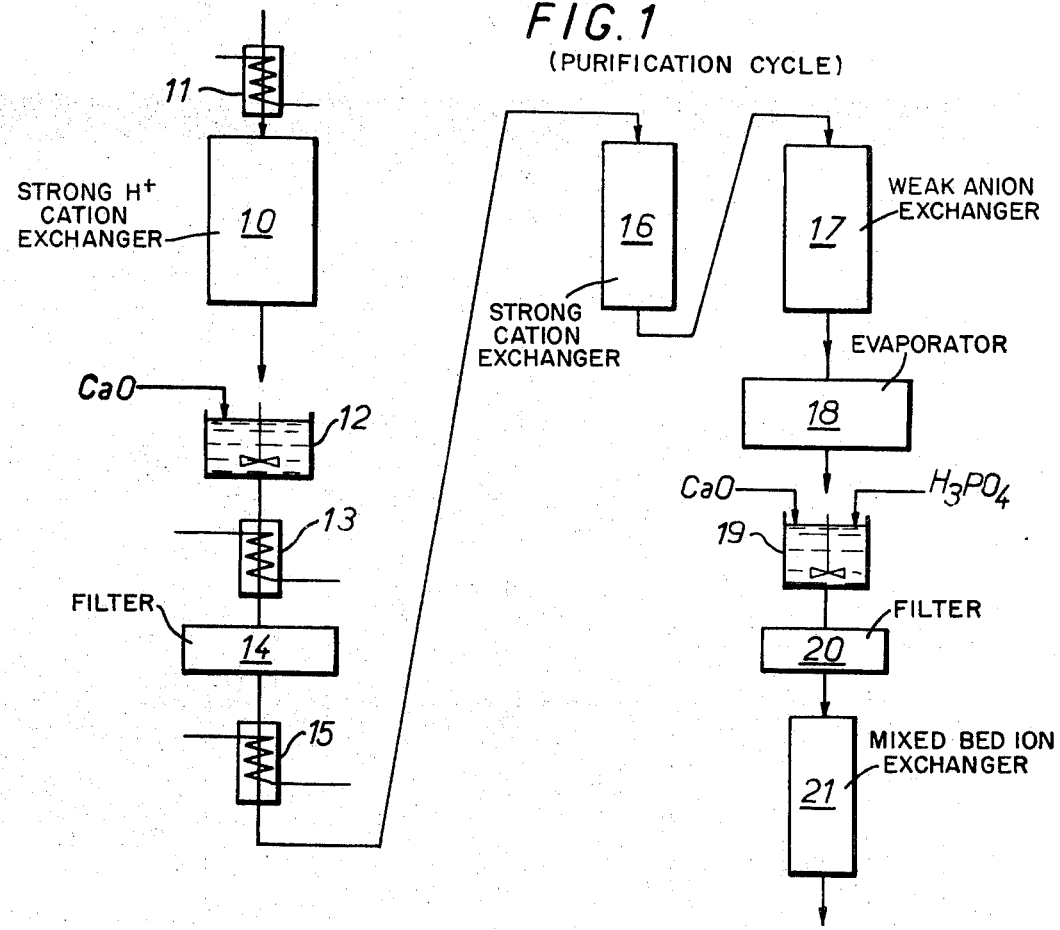
FIG.1 (PURIFICATION CYCLE)
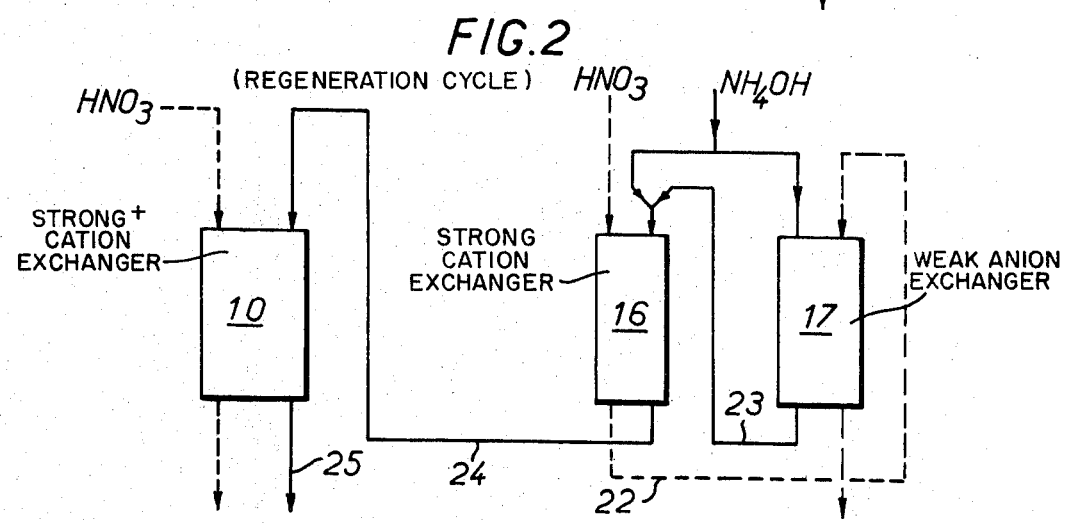
FIG.2 (REGENERATION CYCLE)

PROCESS AND PLANT FOR THE PURIFICATION OF RAW SUGAR JUICE

The present invention is concerned with the manufacture of sugar intended for human consumption and more particularly a novel method of manufacturing substantially purified sugar syrup as well as powdered sugar from the transformation of such syrups.

The raw product used in the manufacture of sugar is in general beet juice suitably depulped which may be a pressure, that is, expressed juice or a diffusion juice obtained according to a common technique by cutting up sugar beet into pieces and extraction by hot water in a counter current apparatus.

The raw juice is commonly subject to a calcocarbonic purification treatment, then to several filtrations until a limpid juice is obtained. It is then concentrated by evaporation then subject to fractional crystalization according to a relatively complex classic method. When relatively pure sugar syrup is desired, the crystallized sugar thus formed is redissolved.

This method has the disadvantage of necessitating numerous and complicated operations which bring about relatively large losses of sugar in he molasses. It requires a previous crystallization necessary to obtain a sufficiently pure product even when the desired end product is a syrup. A method recently proposed using a classic cation exchanger requires a regeneration phase with a boiling alkaline solution which is difficult to carry out.

An object of the invention is a purification process which enables the disadvantages of usual processes to be overcome by dispensing with the necessity to call upon fractional crystallization operations for obtaining syrups of quality for human consumption.

Another aim of the present invention is that in the obtaining of human quality sugar product from raw sugar beet juice or the like, it better enables the exploitation of the possibilities offered by ion exchange purification techniques in thus reducing to a minimum the necessity to call upon evaporation concentration and crystallization operations which are undesirable owing to the large investment as well as the cost of operation.

According to the invention the raw juice is subject to a first group of operations comprising passing through a first strong $H^+$ cation exchanger followed by a lime neutralization and a filtration; then a second group of operations comprising a passage through a second strong cation exchanger followed by the passage through a weak anion exchanger.

The product thus obtained may be consumed once it has been concentrated. This product may also be subject to a finishing treatment with phosphoric acid and lime which may possibly be followed by the passage through a mixed bed ion exchanger;

Preferably, the ion exchange operations are effected at low temperatures in order to prevent the inversion of the saccaharose.

A further object of the invention is a regeneration process for ion exchangers used in the course of the aforesaid first and second groups of operations.

The regeneration process according to the invention consists of sending the regeneration eluate of the anion through the cation exchanger for the first group of operations.

According to another aspect of the invention the alkaline regeneration from the anion exchanger passes through the first cation exchanger. Preferably, the alkaline regeneration is ammonia, the regeneration treatment of this cation being completed with a strong acid.

Preferably, an additional amount of ammonia is added to the regeneration eluate of the anion exchanger passing successively through the second cation exchanger and the first cation exchanger.

Further, the invention preferably provides the elution of the anion exchanger by the strong acid solution coming from the regeneration of the second cation exchanger, the anion exchanger being then regenerated by ammonia.

The arrangement according to the invention enables the elimination of the complex crystallization phase necessary for the purification of the sugar in known processes, and it enables the obtaining of a liquid sugar slightly coloured having a purity greater than 99 percent with reduced losses.

The arrangements also permit the elimination of reactiviating the cation exchangers with a boiling alkaline solution.

Another aspect of the invention is the plant adapted to carry out the present process.

The invention will now be described by way of non-limiting example with reference to the accompanying drawings wherein:

FIG. 1 is a diagram showing a raw juice treatment process according to the invention;

FIG. 2 is a diagram illustrating the regeneration circuits for the ion exchangers for carrying out the process according to the invention.

In FIG. 1 a raw juice such as a diffusion juice is introduced into a strong $H^+$ cation exchanger 10 after possibly having passed through a cooling device 11 by which it is cooled to a temperature about 10° in order to avoid inversion. The juice obtained at the outlet of the exchanger 10 is relatively acidic. It undergoes a neutralization by stirring with limz (milk lime or powdered lime) at 12 before being reheated at 13 in order to pass through a filter 14 which retains a cake capable of being recuperated and added to the dried pulp coming from the intitial sugar beet treatment.

In order to avoid inversion the filtrate is again cooled in 15 before passing a second cation exchanger 16 then a weak anion exchanger 17.

The juice obtained at the outlet of the exchanger 17 is very slightly coloured and its purity is greater than 99°. It may be concentrated in an evaporator 18 in order to be delivered eventually in syrup form. It may also be subject to a subsequent purification process comprising a phase for the addition of phosphoric acid and for neutralization with lime schematized at 19 in order to precipitate very small amounts of colloidal substances remaining, then after passing through a filter 20 a final pass through mixed weak cation and strong anion exchanger 21, for example of the mixed bed type.

The final syrup is comparable to the remelted product of very high quality white sugars.

The ion exchangers are exhausted after the juice subject to ionic exchange us passed therethrough and must then be regenerated. The ion exchangers, and in particular the exchanger 10 located first in line, also have the tendency to be clogged up with more or less colloidal products contained in raw juice.

This is why the regeneration treatment per se is advantageously preceded by a cleaning consisting of loosening the resin and circulating an eluant.

FIG. 2 shows the path of elution and regeneration fluids advantageously usuable for the exchangers 10, 16 and 19 in FIG. 1 which enables the use of the same liquor for effecting the regeneration of the anion exchanger and the elution of the cation exchanger and vice versa. The flow path in solid lines are those of the alkaline liquors whereas the paths in dotted lines are those of the acid liquors.

After loosening and elution the cationic exchangers 10 and 16 are regenerated by the introduction of a strong acid such as $HNO_3$. The regeneration acid for the exchanger is then expelled through the drain, whereas the one which goes through the exchanger 16 is recovered in a conduit 22 for effecting the elution of the anionic exchanger 17 before being carried away to the drain. The regeneration of the exchanger 17 at its outlet is reintroduced into the exchanger 16 before regeneration thereof in order to eluate the products such as amino acid, proteins or other products having actionic character fixed on the exchanger, as shown in FIG. 2; the fluid flowing in the conduit 23 may be reenriched with ammonia for entering the exchanger 10. It leaves the exchanger 10 that it extends through before being passed out through waste pipes as shown at 25. In order to simplify the showing, the different members, such as valves and tanks enabling sequential flow of the various fluids, are not shown in FIG. 2.

In order to better understand the invention, an example of the process of manufacture according to the invention accompanying the principal numerical date will be indicated below.

EXAMPLE

The raw juice is a diffusion or pressure sugar beet juice suitably depulped before treatment. In order to obtain saccharose, it is cooled to 10°C before passing at the rate of 10–12 liters through a first cationic exchanger containing 700 ml of a strong cation exchanger resin, forms $H^+$ of the type known under commercially the name of Amberlite I.R.120. This mass of resin corresponds to a non-sugar amount of 160–180 g in the juice; the saturation of the resin exchanger column is followed by measuring the conductivity of the outlet juice from the exchanger. As soon as this begins to diminish, the supply of juice to the exchanger is cut off. The flow rate is 4–6 volumes per hour.

The pH of the juice is of the order of 1.9; it is brought up to 7.0 by adding 2 to 2.5 g of lime per liter of juice.

Before filtration the neutralized juice is heated to 82°C and maintained for 5 minutes at this temperature. The filtration is rather easy and the juice obtained is limpid. There is no amine taste or colour, the amounts of metal alkalines, in particular potassium, is very low. On the other hand, the amount of calcium reaches nearly 1 g of CaO per liter. Its pH is 6.2–6.6.

Before passing successively through the second strong cation exchanger and the weak exchanger, the juice undergoes a further recooling to 10°C when inversion is to be avoided at this stage. For the quantity of juice initially indicated the second strong cation exchanger contains 300 ml of Amberlite I.R.120 resin, and the weak anion exchanger contains 450 ml of Amberlite I.R.A. 68. The flow rate is 3 volumes of juice per volume of the combination of the two resins per hour. The product obtained is a juice having a slight coloration and purity greater than 99 percent.

If an even purer product is desired, it may be subject to one or two states of finishing treatment described above, after being concentrated to the level desired for use, for example 66 percent by weight of sugar. Phosphoric acid is then added until a pH of 4, it is then neutralized by CaO to a pH of 8 and undergoes separation of floataion. The second stage of this finishing treatment is effected in mixed bed ion exchangers using 175 ml of "Amberlite X.E. 253" as the strong ionic resin and 100 ml of "Amberlite I.R.C. 50" as the weak catonic resin. For the regeneration these resins are separated and regenerated by soda and a strong acid respectively. The length of the cycle for passing through the mixed bed may be of the order of several days owing to the high viscosity of the syrup and the low quantity of impurities to separate. The quantities of the aforementioned resins correspond to the treatment of juice coming from 10 operating cycles of the exchangers used upstream of the mixed bed.

What we claim is:

1. A process of purifying raw sugar juice such as diffusion or expressed sugar beet juice comprising passing the juice through a first strong $H^+$ cation exchanger, neutralizing the resultant liquid with lime, filtering the neutralized liquid, and then passing the liquid successively through a second strong cation exchanger and a weak anion exchanger.

2. A process according to claim 1, wherein the said neutralization with lime is effected by the addition of lime not exceeding 3 g of lime per liter of liquid treated.

3. A process according to claim 1, wherein said raw sugar juice is sugar beet juice.

4. A process according to claim 1, and eluting said first strong cation exchanger with an alkaline solution, and thereafter regenerating said first cation exchanger.

5. A process according to claim 4, wherein the regeneration of the anion exchanger is effected by an alkaline solution and wherein the said alkaline solution constitutes at least a portion of the elution fluid of said first cation exchanger after passing through the cation exchanger.

6. A plant for the purification of raw sugar juice, such as expressed juices and diffusion juices, comprising a first strong $H^+$ cation exchanger having an inlet for raw juice and an outlet, lime neutralizing means having an inlet connected to the outlet of said first strong cation exchanger and an outlet, a second strong cation exchanger having an inlet connected to the outlet of said neutralizing means and having an outlet, a weak anion exchanger having an inlet connected to the outlet of the second strong cation exchanger, a first cooling device through which passes the raw juice before entering said first strong $H^+$ cation exchanger, a reheating device having an inlet connected to the outlet of the neutralizing means, a filter having an inlet connected to the outlet of the reheating device, and a second cooling device having an inlet at the outlet of the filter and an outlet connected to the inlet of the second strong cation exchanger.

7. A plant according to claim 6, further comprising a phosphoric acid and lime purification device having an inlet connected with the outlet of said weak anion exchanger and a mixed weak cation and strong anion exchanger having an inlet connected to the outlet of the purification device.

8. A plant according to claim 7, further comprising a first fluid circuit connected to a source of strong acid and adapted to regenerate said first strong cation exchanger, and a second fluid circuit comprising from upstream to downstream a source of strong acid, a path for the regeneration of the second strong cation exchanger and an elution path for the said weak anion exchanger.

9. A plant according to claim 8, wherein said strong acid is nitric acid and said alkaline solution is ammonia solution.

10. A plant according to claim 8, further comprising a third fluid circuit comprising from upstream to downstream a source of alkaline solution, a regeneration path for the said weak anion exchanger, an elution path for said second strong cation exchanger and an elution path for said first strong cation exchanger.

11. A plant according to claim 10, further comprising means for introducing fresh alkaline solution into said third fluid circuit at the inlet of said elution path for said second strong cation exchanger.

* * * * *